(12) United States Patent
Suzuki et al.

(10) Patent No.: US 8,031,437 B2
(45) Date of Patent: Oct. 4, 2011

(54) DISK DRIVE DEVICE

(75) Inventors: Hiroyuki Suzuki, Kanagawa (JP);
Yoshio Uematsu, Kanagawa (JP)

(73) Assignee: Hitachi Global Storage Technologies Netherlands B.V. (NL)

( * ) Notice: Subject to any disclaimer, the term of this patent is extended or adjusted under 35 U.S.C. 154(b) by 496 days.

(21) Appl. No.: 12/313,641

(22) Filed: Nov. 20, 2008

(65) Prior Publication Data

US 2009/0213498 A1 Aug. 27, 2009

(30) Foreign Application Priority Data

Dec. 21, 2007 (JP) ................................ 2007-331105

(51) Int. Cl.
*G11B 5/48* (2006.01)
(52) U.S. Cl. ............... 360/234.5; 360/245.8; 360/245.9; 360/266.3; 360/244.1
(58) Field of Classification Search ............... 365/194.4, 365/126, 125, 266.3, 234.5, 244.1, 97, 264.2, 365/245.9, 245.8; 360/266.3, 234.5, 244.1, 360/97, 264.2, 245.9, 245.8
See application file for complete search history.

(56) References Cited

U.S. PATENT DOCUMENTS

| 7,605,999 B1 * | 10/2009 | Kung et al. ............... 360/97.01 |
| 2007/0097549 A1 | 5/2007 | Yamaguchi et al. |
| 2007/0223148 A1 * | 9/2007 | Ding et al. .................... 360/323 |

FOREIGN PATENT DOCUMENTS

| JP | 2007-105750 | 4/2007 |
| JP | 2007-141948 | 6/2007 |

OTHER PUBLICATIONS

Nagasaki et al., "The Third Face of Tin", Solid Physics 1, (1967), pp. 47-51.
Koyama et al., "The Simple Hexagonal to β-Sn Martensitic Transformation in Sn-(7.0-9.5) at.% In Alloys", Acta Metal. 37 (1989) pp. 597-602.
Okamoto, Phase Diagrams for Binary Alloys, ASM International, Materials Park, OH (2000), p. 491.

* cited by examiner

*Primary Examiner* — Thong Q Le
(74) *Attorney, Agent, or Firm* — Mahamedi Paradice Kreisman LLP; Christopher J. Brokaw

(57) ABSTRACT

Embodiments of the present invention provide a highly reliable hard disk drive (HDD). In an HDD according to an embodiment of the present invention, solder at a solder joint for joining a pad of a head slider and a pad of a transmission wiring comprises the main component of Sn and atomic percent to atomic percent of indium. The solder exhibits the γ phase within the range of −150° C. to 120° C. Accordingly, even if the HDD is left at a low temperature for a long time, the solder joint is not broken.

20 Claims, 4 Drawing Sheets

(a)

(b)

(c)

DISK DRIVE DEVICE

CROSS-REFERENCE TO RELATED APPLICATION

The instant nonprovisional patent application claims priority to Japanese Patent Application No. 2007-331105, filed Dec. 21, 2007 and which is incorporated by reference in its entirety herein for all purposes.

BACKGROUND OF THE INVENTION

Currently, devices using various kinds of media, such as optical disks, magnetic disks, magneto-optical disks, or the like, have been known in the art as data storage devices. In particular, hard disk drives (HDDs) have been widely used as storage devices of computers. Moreover, the HDDs have found application to moving image recording/reproducing apparatuses, car navigation systems, digital cameras, cellular phones, and the like in addition to conventional laptop and desktop computers.

An HDD comprises a head slider for accessing (reading or writing) a magnetic disk and an actuator for supporting the head slider and swinging to move the head slider above the magnetic disk. The actuator comprises a suspension on which the head slider is fixed. The airflow viscosity between the head slider and the spinning magnetic disk balances the force applied to the head slider by the suspension to allow the head slider to fly over the magnetic disk.

Solder ball bonding (SBB) has been known in the art as a method for electrically joining a slider and a wiring on a suspension (actuator). A conventional SBB method disposes solder balls between connection terminals of a slider and those of a transmission wiring disposed on the suspension and reflows them by laser beam to electrically interconnect the connection terminals of the slider and the transmission wiring on the suspension (for example, refer to Japanese Patent Publication No. 2007-128574 ("Patent Document 1"). The other end of the transmission wiring is connected to a substrate on which a preamplifier IC to be fixed to the actuator is mounted with solder. Recent request for lead-free materials demands that the above-described solder balls and a solder joint to be used in connecting the transmission wiring and the substrate be made of lead-free solder.

Diversification of applications for HDDs leads to diversification of the use environment for HDDs. For example, HDDs have recently come to be used under conditions where temperature changes drastically, like in car navigation systems. Specifically, an HDD is requested to be operable under severe conditions such as at a temperature of 90° C. (363 K) or −40° C. (233 K). Changes in environmental temperature cause application of a large thermal stress to a solder joint. In contrast, solder in common use has low material yield strength. Therefore, sufficient joining reliability in solder joining of a transmission wiring, particularly solder joining between a transmission wiring and a head slider, is demanded for thermal stress accompanying changes in temperature environment in use of an HDD.

A common material of lead-free solder is an alloy mainly composed of tin (Sn). The alloy undergoes phase transformation (transition) as described in "The Third Face of Tin", Seizo Nagasaki, Kotai Butsuri, Solid Physics 1, (1967), pp. 47-51 ("Non-Patent Document 1"). That is, if the operation temperature is lowered to −40° C. (233 K), a phase transformation from the β-Sn structure to the α-Sn structure occurs so that the solder joint gets likely to break. In addition, "The Simple Hexagonal to β-Sn Martensitic Transformation in Sn-(7.0-9.5) at. % In Alloys", Y. Koyama and H. Suzuki, Acta Metal. 37 (1989) pp 597-602 ("Non-Patent Document 2") has reported that Sn-(7.0-9.5) at. % In alloys of the tin and indium (In) alloy system undergo martensitic transformation. If a martensitic transformation occurs between the simple hexagonal structure and the β-Sn structure, lenticular surface reliefs induced by the martensite are generated, which may develop a crack due to stress concentration caused by peaks and valleys of the reliefs.

Japanese Patent Publication No. 2007-141948 ("Patent Document 2") discloses use of a Sn—In series alloy in solder joining between a semiconductor element mounting substrate and a heat sink. Further, it discloses a preferable solder composition of Sn—In series alloys containing no less than 14.5% of In. However, the Sn—In series alloys in this range include compositions which cannot attain mechanical reliability in a broad temperature range. Specifically, martensitic transformations accompanying changes in temperature, deformations at grain boundaries accompanying changes in solid solubility limit of the β phase, transformations of α-Sn at low temperature, or the like are not taken into consideration.

In Japanese Patent Publication No. 2007-105750 ("Patent Document 3"), a 1000-cycle test is disclosed with cycle condition of −40° C. to 125° C., 30 minutes of retention time, and 5 minutes of cycle transformation time. However, it does not propose the optimum range of a tin alloy in consideration of an aging effect caused by exposure at low temperature for a long time. Consequently, a solder joint is demanded which is highly reliable in actual use of an HDD at −40° C. to 90° C., and does not break even after exposure at low temperature for a long time.

BRIEF SUMMARY OF THE INVENTION

Embodiments of the present invention provide a highly reliable hard disk drive (HDD). In an HDD according to the particular embodiment of FIGS. 3(a)-3(c), solder at a solder joint 19 for joining a pad 151 of a head slider 15 and a pad 212 of a transmission wiring 21 comprises the main component of Sn and 15 atomic percent to 27 atomic percent of indium. The solder exhibits the γ phase within the range of −150° C. to 120° C. Accordingly, even if the HDD 1 is left at a low temperature for a long time, the solder joint 19 is not broken.

DETAILED DESCRIPTION OF THE INVENTION

Figure 1:
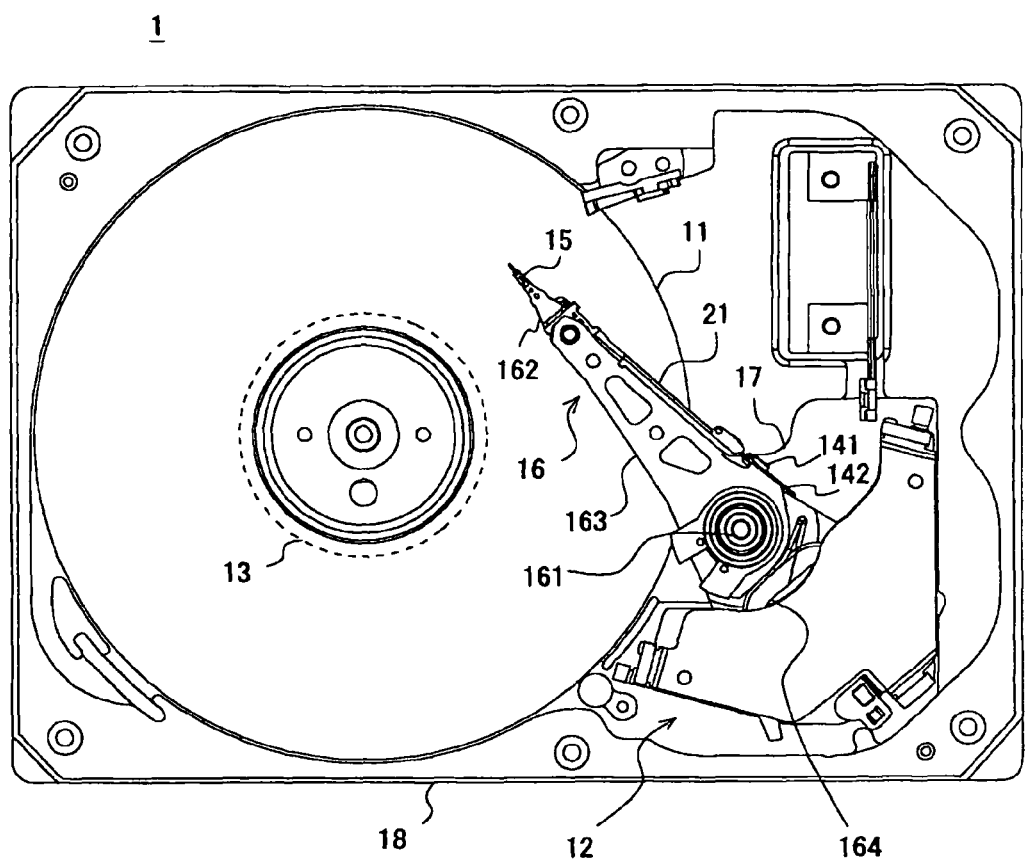
FIG. 1 is a top view schematically depicting an internal configuration of an HDD main body in an embodiment.

Embodiments of the present invention relate to a disk drive device, more particularly to a solder joint of a wiring disposed on an actuator mounted in a disk drive device for transmitting head signals.

A disk drive device according to an aspect of embodiments of the present invention comprises a head for accessing a disk, an actuator for supporting the head to move the head above the magnetic disk, a transmission wiring disposed on the actuator for transmitting signals of the head, and solder for connecting the transmission wiring on the actuator and comprising the first main component of tin and the second main component of indium, the crystal structure formed by the first main component of tin and the second main component of indium being a simple hexagonal structure at least within a temperature range of −40° C. to 90° C. The solder with this composition and crystal structure does not undergo structural phase transformation within the temperature range of −40° C. to 90° C., which increases the reliability of solder joining.

A disk drive device according to another aspect of embodiments of the present invention comprises a head for accessing a disk, an actuator for supporting the head to move the head above the magnetic disk, a transmission wiring disposed on the actuator for transmitting signals of the head, and solder containing the main component of tin and 15 atomic percent to 27 atomic percent of indium for connecting the transmission wiring on the actuator. The solder with this composition and crystal structure does not undergo structural phase transformation within the temperature range of −40° C. to 90° C., which increases the reliability of solder joining.

The solder may contain at least one element selected from a group of cobalt, silver, and copper as an additive element. These additive elements forms intermetallic compounds with tin to reduce the developing speed of a crack. The solder may contain 0.001 atomic percent to 1 atomic percent of cobalt; may contain 0.1 atomic percent to 3.8 atomic percent of silver; or may contain 0.1 atomic percent to 1.3 atomic percent of copper. These can lower the melting point of the solder, reduce the defect density, and form intermetallic compounds which reduce the developing speed of a crack.

The solder according to embodiments of the present invention is particularly useful in connecting an electrode pad of the head and the transmission wiring. Further, if a gold film is made on a contact surface of the electrode pad to the solder, a layer mainly comprising an intermetallic compound or a solid solution of gold, tin, and indium between the pad and the solder is provided. This interferes with the transferring of fatigue, to accomplish solder joining with equal or more strength than tin solder.

According to embodiments of the present invention, an optimized solder composition can provide a highly reliable disk drive device capable of preventing a crack of solder and a break in a component caused by development of the crack even if the device has been left at −40° C.

Hereinafter, particular embodiments of the present invention will be described. Throughout the drawings, like components are denoted by like reference numerals, and their repetitive description is omitted if not necessary for clarity of explanation. Hereinafter, detailed descriptions will be given on a hard disk drive (HDD) as an example of a disk drive device. A feature of the embodiments is a solder joint on a transmission wiring disposed on an actuator for transmitting head signals, and in particular, a solder joint connecting a transmission wiring and a head slider. The solder in the solder joint comprises tin (Sn) as a first main component and indium (In) as a second main component in a lower proportion than Sn. The proportion of indium is within the optimum range so as to attain mechanical reliability in a broad temperature range.

First, the configuration of an HDD on which a head slider and an actuator are mounted will be described referring to FIG. 1. A spindle motor 13 spins a magnetic disk 11 in a base 18 of an HDD 1. An actuator 16 is pivotably supported by a pivotal shaft 161 and is driven by a voice coil motor (VCM) 12 as a driving mechanism. The actuator 16 comprises components of a suspension 162, an arm 163, and a flat coil 164 coupled in its longitudinal direction in order from the tip end where a head slider 15 is placed. The structure of the suspension 162 will be described in detail later.

The VCM 12 pivots the actuator 16 in its transverse direction about the pivotal shaft 161 in accordance with driving signals transmitted across the flat coil 164 from a controller (not shown). The actuator 16 moves the head slider 15 above the magnetic disk 11 in the radial direction, so that the head slider 15 accesses (reads or writes) a desired track.

A transmission wiring 21 transmits signals between the head slider 15 and a controller (preamplifier IC 141). One end of the transmission wiring 21 is connected to the head slider 15 and the other end is connected to a substrate 142 on which the preamplifier IC 141 is mounted. The substrate 142 is fixed in the vicinity of the pivotal shaft 161 of the actuator 16. The transmission wiring 21 is connected to the head slider 15 and the substrate 142 with solder. The wiring 17 transmits signals between the preamplifier IC 141 and a controller located on the outside of the enclosure.

The manufacture of an HDD mounts a head stack assembly (HSA) which is an assembly of an actuator 16 and a head slider 15, an SPM 13, a magnetic disk 11 and the like inside a base 18 and then secures a top cover (not shown) to the base 18. Finally, a control circuit board (not shown) is mounted to finish an HDD 1.

Figure 2:
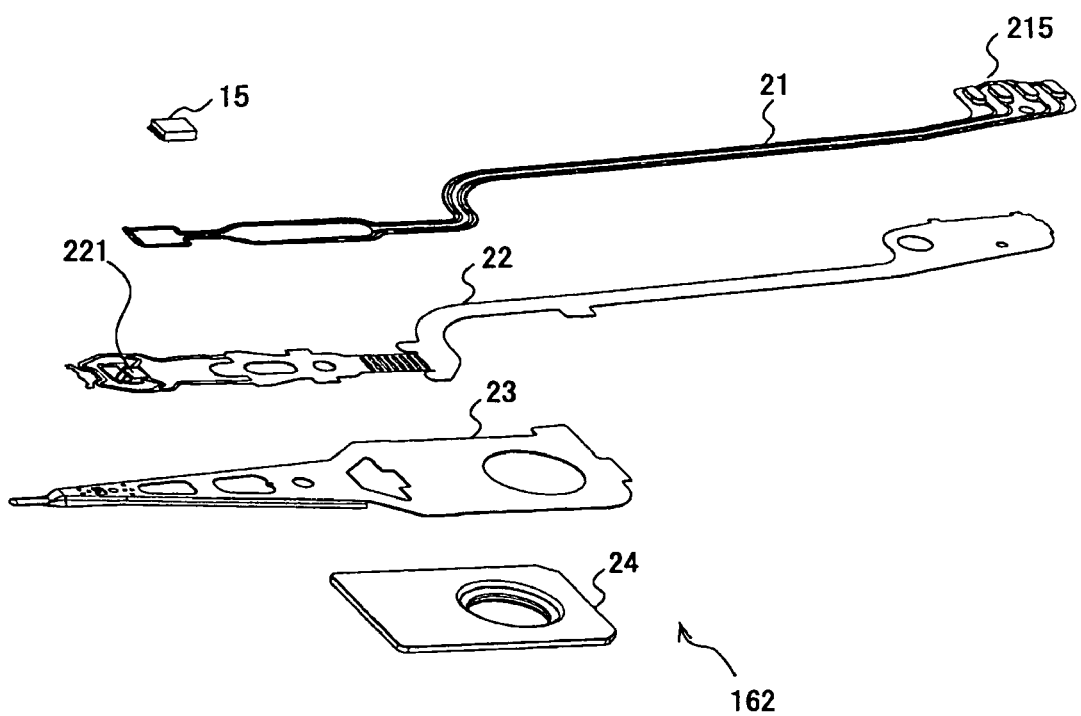
FIG. 2 is an exploded perspective view depicting a structure of a head gimbal assembly in an embodiment.

FIG. 2 is an exploded perspective view depicting the configuration of a head gimbal assembly (HGA) 20, which is an assembly of a suspension 162 and a head slider 15. The HGA 20 comprises a head slider 15, a suspension 162, and a transmission wiring 21. The suspension 162 comprises a gimbal 22, a load beam 23, and a base plate 24.

The transmission wiring 21 transmits signals of the elements on the head slider 15. The number of leads in the transmission wiring 21 can vary depending on the configuration of the head slider 15. An end of the transmission wiring 21 is a multiconnector 215 having connection terminals of the leads. The multiconnector 215 is connected to a substrate 142 on which the preamplifier IC 141 is mounted with solder. The other ends of the leads are connected to connection terminals formed on the gimbal 22. These connection terminals are connection terminals of the transmission wiring 21 and connected to connection pads on the head slider 15 with solder balls. This will be described later.

The load beam 23 is made of stainless steel, for example, and functions as a fine leaf spring. The load beam 23 has a shape extending lengthwise in the direction orthogonal to the pivot direction, a thin shape, a light weight, and necessary rigidity. The elasticity of the load beam 23 causes a load counteracting the flying force of the slider 15. Balancing this load with the pressure (flying force) caused by the air viscosity between the air bearing surface (ABS) of the head slider 15 and the spinning magnetic disk II allows the head slider 15 to fly at a desired fly-height.

The gimbal 22 is welded to the surface facing the magnetic disk 11 of the load beam 23 by laser spot welding. Or it may be fixed by swaging. The gimbal 22 is made of stainless steel, for example. The gimbal 22 has an intended elasticity and is made deformably. In the front part of the gimbal 22, a tongue-like shaped gimbal tongue 221 is made. The head slider 15 is bonded on the gimbal tongue 221. The gimbal tongue 221 can tilt the head slider 15 in a pitch or a roll direction.

Figure 3:
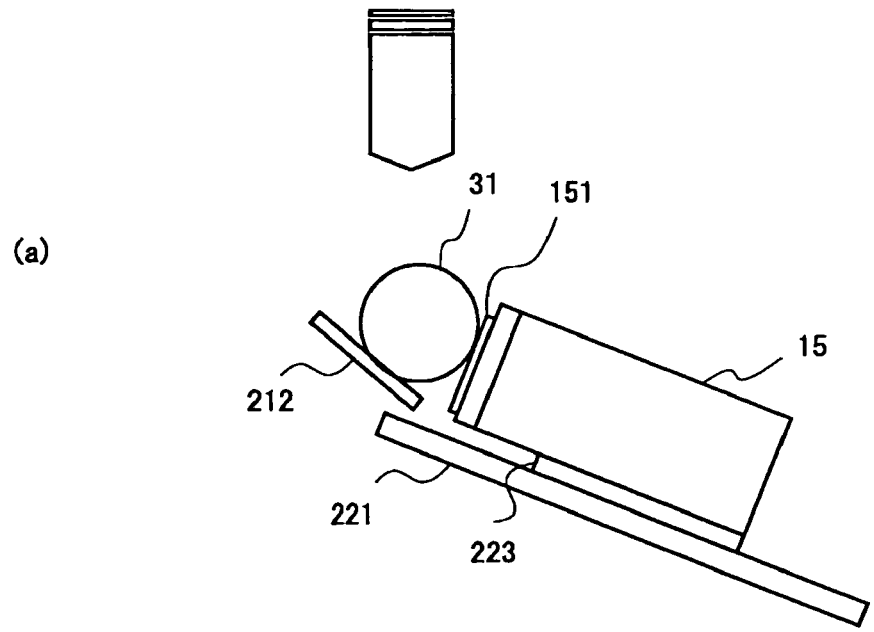
FIGS. 3(a)-3(c) schematically illustrate a reflow process for solder joining between a head slider and a transmission wiring in an embodiment.
Figure 3:
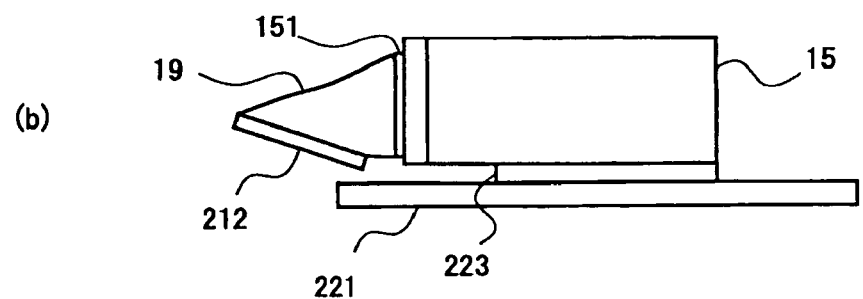
Figure 3:
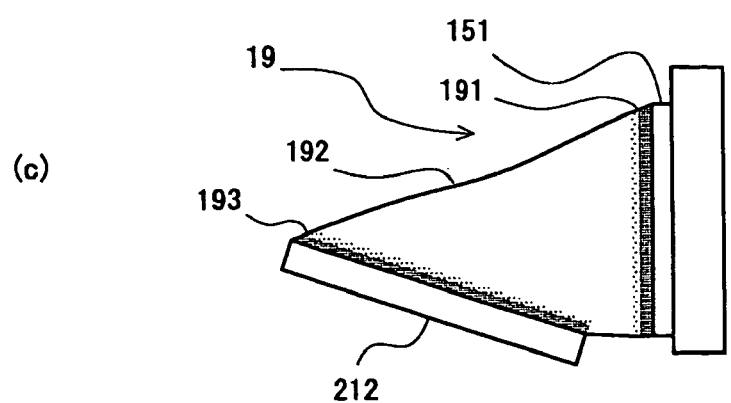

FIGS. 3(a)-3(c) schematically illustrate a reflow process for solder joining between the head slider 15 and the transmission wiring 21. The solder joining of the head slider 15 uses a solder ball 31. A feature of the present embodiment is the composition of the solder ball 31. Specifically, the solder ball 31 is made of an alloy containing the first main component of tin (Sn) and the second main component of indium (In). The details of the composition of the solder ball 31 will be described later.

As illustrated in FIG. 3(a), the head slider 15 is bonded to a gimbal tongue 221 with an adhesive layer 223. The head slider 15 comprises a connection pad 151, and the solder ball 31 is disposed between the connection pad 151 and a connection terminal 212 of the transmission wiring 21. On the surfaces of the connection pad 151 and the connection terminal 212, gold thin films are formed by plating. Irradiating laser beam onto the solder ball 31 disposed between the connection pad 151 and the connection terminal 212 causes the reflow process which melts the solder ball 31. During this reflow process, the solder ball 31 is in an inactive gas atmosphere. During the reflow process, the inactive gas surrounds the solder ball 31 to prevent oxidization of the solder ball 31.

As shown in FIG. 3(b), the connection pad 151 and the connection terminal 212 are joined with the solder joint 19 after the reflow process. FIG. 3(c) is an enlarged view of the solder joint 19. The solder joint 19 comprises principally three layers. They are a first gold dispersed layer 191 with a high proportion of gold (Au), a Sn—In series alloy layer 192 in the simple hexagonal structure, and a second gold dispersed layer 193 with a high proportion of gold (Au).

When the solder ball 31 reflows by laser beam, the surface gold films of the connection pad 151 and the connection terminal 212 are melted into the solder joint 19. Consequently, the first gold dispersed layer 191 and the second gold dispersed layer 193 in which gold atoms are dispersed are formed in the solder joint 19. The proportion of gold in the first gold dispersed layer 191 gradually decreases away from the connection pad 151. Similarly, the proportion of gold in the second gold dispersed layer 193 gradually decreases away from the connection terminal 212.

The solder ball 31 according to one embodiment is made of a Sn—In series alloy with an appropriately selected composition; the Sn—In series alloy layer 192 maintains the simple hexagonal structure in a broad temperature range. In contrast, the crystal structure of gold is the face-centered cubic structure. The first gold dispersed layer 191 and the second gold dispersed layer 193 are buffer layers between gold layers and the Sn—In series alloy layer 192 with different crystal structures from the gold layers, and mainly composed of an intermetallic compound or a solid solution of gold, tin, and indium.

The β-phase of the Sn—Au series alloy and the $\alpha_1$-phase of the In—Au series alloy have the $Ni_3Ti$ type of DO24 structures. And, it is known that both of the ζ-phase of the Sn—Au series alloy and the ζ-phase of the In—Au series alloy form the hexagonal closed packed structures. Therefore, the solder composed of the Sn—In series alloy joins gold as well as Sn solder. Further, the $\alpha_1$-phase of the In—Au series alloy has a higher melting point than the β-phase of the Sn—Au series alloy, and the ζ-phase of the In—Au series alloy has a higher melting point than the ζ-phase of the Sn—Au series alloy. Accordingly, addition of In assists to stably generate an intermetallic compound having the DO24 structure with a higher melting point than the Sn—Au series alloy or a solid solution having the hexagonal closed packed structure to compose a more preferable solder joint 19 than of Sn solder.

Hereinafter, a solder material to be used in the solder ball 31 of one embodiment will be specifically described. Solder has a lower material yield strength than common metals such as steel, aluminum or the like. Deformation caused by change in temperature environment in use of an HDD 1 applies stress to the solder joint 19 having lower yield strength.

If yield strength in the solder joint 19 is too low, the stress induces a crack at the solder joint 19. Accordingly, it is necessary that the solder joint 19 be made of a solder to be able to endure a certain stress. For using a lead-free solder mainly composed of tin (Sn), it is necessary to take account of structural phase transformation accompanying temperature change. A lead-free solder may be an alloy containing a first main component of tin and a second main component of indium (In), where the first main component is the component with the largest rate of content and the second main component is the component with the next largest rate of content.

It has been known that tin alloys exhibit phase transformation (transition) with temperature. A typical phase transformation is a phase transformation between the β-Sn structure and the α-Sn structure. This phase transformation increases the possibility of break in the solder joint 19. Besides, Sn-(7.0-9.5) at. % In alloys in the tin and indium alloy system undergo martensitic transformation. If a martensitic transformation occurs between the simple hexagonal structure and the β-Sn structure, lenticular surface reliefs induced by the martensite may be generated at the solder joint 19, which may develop a crack due to stress concentration caused by peaks and valleys of the reliefs.

One embodiment uses a solder with the composition range where structural phase transformation does not occur within a temperature range of −40° C. to 90° C. in an HDD 1 assuring operation at subfreezing temperatures. Specifically, Sn—In series alloys are used as the solder material and their compositions are selected to be in the γ phase and not to undergo phase transition into another phase in the above temperature range. This accomplishes high reliability in a hermetically sealed structure under designed use (operational) conditions for the HDD 1.

Figure 4:
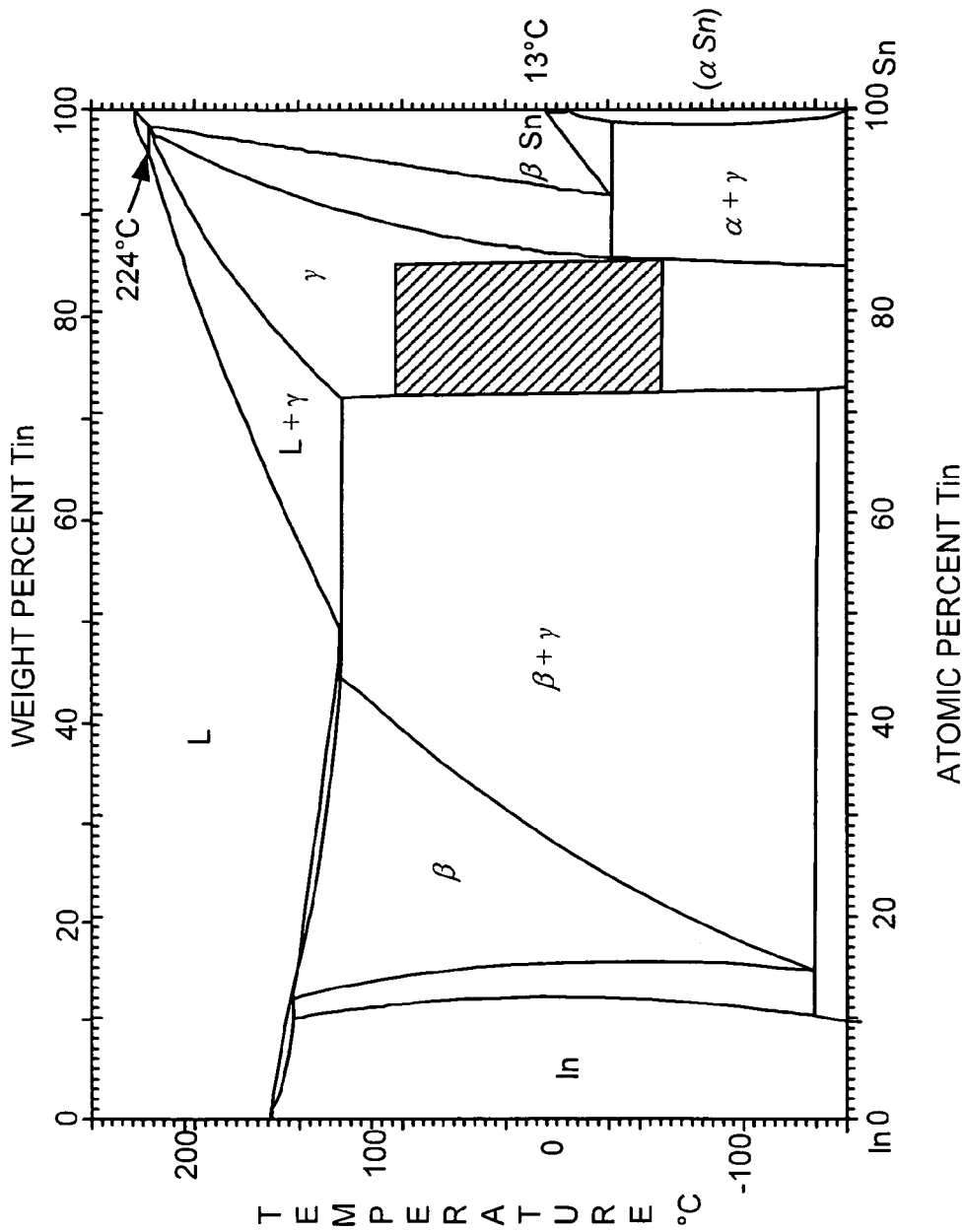
FIG. 4 is a phase equilibrium diagram of a Sn—In system.

FIG. 4 is a phase equilibrium diagram of the Sn—In system. In FIG. 4, the vertical axis represents temperature; the horizontal axis represents composition in atomic percent or weight percent. The most left point in the horizontal axis represents a composition with 100% of In and the most right position represents a composition with 100% of Sn. As traveling from the left to the right along the horizontal axis, the rate of content of In decreases and the one of Sn increases. In this diagram, L denotes liquid; and α, β, and γ denote the phases of the solids. The symbol x+y means that two phases of x and y coexist. This diagram is cited in Phase Diagrams for Binary Alloys, H. Okamoto, ASM International, Materials Park, Ohio (2000), p. 491. ("Non-Patent Document 3").

In one embodiment, Sn—In series alloys with the compositions to be in the simple hexagonal structure in the temperature range of at least −40° C. to 90° C. are used as the solder material for the solder ball 31 to form the solder joint 19. They are the Sn—In series alloys whose compositions are in the hatched area in the diagram of FIG. 4. More specifically, Sn-(15-27) at. % In alloys which are in the γ phase within the range of −150° C. to 120° C. are used.

The alloys with these compositions are in a single phase area of the simple hexagonal structure within the range of −150° C. to 120° C. and do not undergo the structural phase transformation at normal pressures, so that mechanical reliability increases. Although the crystal structure may change if the air pressure significantly changes, such a change in the air pressure substantially does not occur in the actual use environment of the HDD 1. Therefore, use of the Sn—In series alloys which can maintain their simple hexagonal structure within the temperature range of −40° C. to 90° C. at 1 atm accomplishes a highly reliable solder joint 19.

As understood from the phase equilibrium diagram of FIG. 4, Sn—In alloys with In content of less than 15 at. % undergo a phase transformation from the simple hexagonal structure to the β-Sn structure or get into a two-phase coexistent state with decrease in temperature. The precipitated β-Sn is not preferable since it may transform into the α-Sn due to further temperature decrease or stress concentration. The Sn—In alloys with In content of more than 27 at. % are not preferable either since the β phase having the fct(bct) structure is precipitated from the mother phase of the γ phase as the second phase so that separation into two phases progresses to induce segregation that may cause stress concentration at the grain boundaries.

A small amount of another specific element may be added to the Sn—In alloy to be used as the solder material at the solder joint 19 (solder ball 31). Specifically, any of silver (Ag), copper (Cu), and cobalt (Co) may be added. These additive elements form intermetallic compounds with Sn to reduce the developing speed of a crack in the solder joint 19.

The content of Co, Ag, and Cu may be 0.001 to 1 at. %, 0.1 to 3.8 at. %, and 0.1 to 1.3 at. %, respectively. The additive elements within these ranges can lower the melting point of solder, reduce the defect density, and form intermetallic compounds which slow the development of a crack. This increases the easiness in manufacture and reliability of the solder joint 19. Even if an additive element is added, the first and second main components of Sn and In form simple hexagonal structures and the second additive element generates a bit amount of intermetallic compound as a second phase.

As described above, controlling the composition of solder and using the solder which does not become the β-Sn structure within the guaranteed operational temperature for an HDD 1 prevents phase transformation of the solder with temperature change. This prevents the possibility of generation of a crack in the solder joint 19 and the risk of break in components induced by development of the crack even if an HDD 1 is left at −40° C. of the lowest guaranteed operational temperature, so that a highly reliable hermetically sealed HDD 1 can be provided.

Next, experimental results on the solder with composition according to embodiments of the present invention and comparative examples will be described. Sn-(15-27) at. % In alloys were used for the solder alloy. Three types of alloys with typical compositions, a Sn-15 at. % In alloy, a Sn-21 at. % In alloy, and a Sn-27 at. % In alloy, were selected. Employing atomic masses of 118.71 for Sn and 114.818 for In, the three alloys correspond to approximately Sn-14.58 wt. % In, Sn-20.45 wt. % In, and Sn-26.35 wt. % In, respectively, in weight percent (wt. %).

The alloys were vacuum melted. The alloys were rolled into a plate with 0.8 mm thickness at room temperature and degreased, and then sealed in vacuum and solution treated at immediately below the melting point for three days. After that, the temperature was returned to room temperature with a change rate of approximately 1K/s, and the alloys were chemical polished in the mixture of hydrofluoric acid and nitric acid, then their textures were observed at room temperature. As a result, segregations were not observed at grain boundaries. Besides, when the x-ray reflection curves of these alloys were measured using an x-ray diffractometer, only x-ray diffraction peaks which can be explained by the simple hexagonal structure were observed in a temperature range of −40° C. (233K) to 90° C. (363K). The x-ray source was the monochromatic copper characteristic x-ray through a Ni-filter. From these results, it has been revealed that phase separations does not progress in the Sn-(15-27) at. % In alloys within the guaranteed operational temperature range so that the high mechanical reliability can be obtained.

The alloy texture observations were conducted through the same heat treatment as the above example except for using a Sn-12 at. % In alloy, a Sn-13 at. % In alloy, and a Sn-29 at. % In alloy instead of the examples of embodiments of the present invention, Sn-(15-27) at. % In alloys. Further, trial products were experimentally manufactured using these three compositions of solder. The Sn-12 at. % In alloy corresponds to a Sn-11.65 wt. % In alloy; the Sn-13 at. % In alloy, to a Sn-12.63 wt. % In alloy; and the Sn-29 at. % In alloy, to a Sn-28.32 wt. % In alloy, in weight percent (wt. %), respectively.

As a result of the alloy metallographic observations, segregations at grain boundaries were not observed in the Sn-12 at. % In alloy or the Sn-13 at. % In alloy immediately after cooling into room temperature. Segregations at grain boundaries were observed in the Sn-12 at. % In alloy after two-day exposure at room temperature; and in the Sn-13 at. % In alloy, after three-day exposure at room temperature. It has been affirmed that there is no discrepancy between the phase equilibrium diagram and the measured x-ray diffraction reflection diffractive curves if the segregations are assumed to be precipitations of β-Sn. On the other hand, segregations at grain boundaries were observed in the Sn-29 at. In alloy. Since the x-ray diffraction reflection diffractive curve corresponding to this precipitation was also observed, it is assumed that the β phase with high In concentration was precipitated at grain boundaries. It has been revealed that the deformations at the grain boundaries are caused by the thermal history since the β phase has different solid solubility limits for In depending on changes in exposure temperature.

As set forth above, the present invention has been described by way of particular embodiments, but it is not limited to the above-described embodiments. A person skilled in the art can easily modify and add each element in the above embodiments within the scope of the present invention. The solder comprising the Sn—In series alloys of embodiments of the present invention is particularly suitable for connection between a head slider and a transmission wiring, but may be used in interconnection between a transmission wiring and a preamplifier IC substrate. The transmission wiring and the connection pad to be connected may have gold films formed by plating thereon, but embodiments of the present invention can be used in solder joining of a different type of pad. Embodiments of the present invention are useful particularly to HDDs, but may be applied to other types of disk drive devices.

What is claimed is:

1. A disk drive device comprising:
   a head for accessing a disk;
   an actuator for supporting the head to move the head above the magnetic disk;
   a transmission wiring disposed on the actuator for transmitting signals of the head; and
   solder for connecting the transmission wiring on the actuator and comprising the first main component of tin and the second main component of indium, the solder having a crystal structure, formed by the first main component of tin and the second main component of indium, being a simple hexagonal structure at least within a temperature range of −40° C. to 90° C.

2. The disk drive device according to claim 1, wherein the solder is used for connecting an electrode pad of the head and the transmission wiring.

3. The disk drive device according to claim 2, further comprising:
   a gold film formed on a contact surface of the electrode pad to the solder; and a layer mainly composed of an intermetallic compound or a solid solution of gold, tin, and indium between the pad and the solder.

4. The disk drive device according to claim 1, wherein the solder contains at least one element selected from a group of cobalt, silver, and copper as an additive element.

5. The disk drive device according to claim 4, wherein the solder contains 0.001 atomic percent to 1 atomic percent of cobalt.

6. The disk drive device according to claim 4, wherein the solder contains 0.1 atomic percent to 3.8 atomic percent of silver.

7. The disk drive device according to claim 4, wherein the solder contains 0.1 atomic percent to 1.3 atomic percent of copper.

8. The disk drive device according to claim 1, wherein the solder contains 15 atomic percent to 27 atomic percent of indium.

9. A disk drive device comprising:

a head for accessing a disk;

an actuator for supporting the head to move the head above the magnetic disk;

a transmission wiring disposed on the actuator for transmitting signals of the head; and solder containing the main component of tin and 15 atomic percent to 27 atomic percent of indium for connecting the transmission wiring on the actuator, the solder having a crystal structure, formed by said tin and said indium, being a simple hexagonal structure at least within a temperature range of −40° C. to 90° C.

10. The disk drive device according to claim 9, wherein the solder is used for connecting an electrode pad of the head and the transmission wiring.

11. The disk drive device according to claim 10, further comprising:

a gold film formed on the contact surface of the electrode pad to the solder; and a layer mainly composed of an intermetallic compound or a solid solution of gold, tin, and indium between the pad and the solder.

12. The disk drive device according to claim 9, wherein the solder contains at least one element selected from a group of cobalt, silver, and copper as an additive element.

13. The disk drive device according to claim 12, wherein the solder contains 0.001 atomic percent to 1 atomic percent of cobalt.

14. The disk drive device according to claim 12, wherein the solder contains 0.1 atomic percent to 3.8 atomic percent of silver.

15. The disk drive device according to claim 12, wherein the solder contains 0.1 atomic percent to 1.3 atomic percent of copper.

16. A method of soldering transmission wiring in a disk drive device (HDD), comprising:

connecting, using solder, a transmission wiring for transmitting signals between an actuator of the HDD and a read/write head of the HDD, wherein the solder comprises tin and indium, and wherein the solder has a crystal structure, formed by the tin and the indium, being a simple hexagonal structure while the solder is within a temperature range of −40° C. to 90° C.

17. The method of claim 16, wherein the solder contains 15 atomic percent to 27 atomic percent of indium.

18. The method of claim 17, wherein the solder further contains 0.001 atomic percent to 1 atomic percent of cobalt.

19. The method of claim 17, wherein the solder further contains 0.1 atomic percent to 3.8 atomic percent of silver.

20. The method of claim 17, wherein the solder further contains 0.1 atomic percent to 1.3 atomic percent of copper.

* * * * *